US011247719B2

(12) United States Patent
Lee

(10) Patent No.: US 11,247,719 B2
(45) Date of Patent: Feb. 15, 2022

(54) CONTROL METHOD OF MDPS

(71) Applicants: HYUNDAI MOTOR COMPANY, Seoul (KR); KIA MOTORS CORPORATION, Seoul (KR)

(72) Inventor: Sung-Il Lee, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 202 days.

(21) Appl. No.: 16/599,477

(22) Filed: Oct. 11, 2019

(65) Prior Publication Data
US 2020/0130729 A1 Apr. 30, 2020

(30) Foreign Application Priority Data
Oct. 25, 2018 (KR) .................... 10-2018-0128416

(51) Int. Cl.
*B62D 5/04* (2006.01)
*B62D 15/02* (2006.01)
*B62D 6/00* (2006.01)

(52) U.S. Cl.
CPC ......... *B62D 5/0463* (2013.01); *B62D 5/0481* (2013.01); *B62D 6/00* (2013.01); *B62D 15/021* (2013.01)

(58) Field of Classification Search
CPC ...... B62D 5/0463; B62D 5/0481; B62D 6/00; B62D 15/021; B62D 5/0466; B62D 6/08
See application file for complete search history.

(56) References Cited

U.S. PATENT DOCUMENTS

| 8,326,493 B2* | 12/2012 | Kezobo | B62D 5/0463 701/42 |
|---|---|---|---|
| 8,504,243 B2* | 8/2013 | Kageyama | B62D 7/1509 701/41 |
| 2002/0070072 A1* | 6/2002 | Sato | B62D 5/0484 180/446 |
| 2004/0064228 A1* | 4/2004 | Yamamoto | B62D 5/0463 701/41 |
| 2005/0205343 A1* | 9/2005 | Uryu | B62D 5/0481 180/446 |

(Continued)

FOREIGN PATENT DOCUMENTS

KR 10-2013-0064542 A 6/2013
KR 10-2015-0002370 A 1/2015
(Continued)

*Primary Examiner* — Jeff A Burke
*Assistant Examiner* — Joshua Alexander Garza
(74) *Attorney, Agent, or Firm* — Mintz Levin Cohn Ferris Glovsky and Popeo, P.C.; Peter F. Corless

(57) ABSTRACT

A control method of a motor driven power steering (MDPS) for a vehicle may include determining a steering angle of a steering wheel of the vehicle; determining a steering torque variation rate of the vehicle; counting an exceeding number of times that the steering torque variation rate exceeds a predetermined value to store the counted number of times in an MDPS system; and deleting the number of times stored in the MDPS system when the exceeding number of times is less than a predetermined number of times, and applying a reverse phase compensation torque to a steering motor when the exceeding number of times is equal to or larger than the predetermined number of times.

8 Claims, 6 Drawing Sheets

(56) References Cited

U.S. PATENT DOCUMENTS

| | | | |
|---|---|---|---|
| 2007/0055426 A1* | 3/2007 | Hara | G01D 5/145 |
| | | | 701/41 |
| 2008/0078608 A1* | 4/2008 | Hara | B62D 15/0235 |
| | | | 180/446 |
| 2008/0119986 A1* | 5/2008 | Wei | G01D 5/04 |
| | | | 701/41 |
| 2012/0259512 A1* | 10/2012 | Okada | B62D 5/0481 |
| | | | 701/41 |
| 2014/0324311 A1* | 10/2014 | Hagenlocher | B60T 8/1755 |
| | | | 701/70 |
| 2015/0166100 A1* | 6/2015 | Kim | B62D 5/0466 |
| | | | 701/42 |
| 2016/0167707 A1* | 6/2016 | Lee | B62D 15/025 |
| | | | 701/41 |
| 2017/0029021 A1* | 2/2017 | Lee | G05D 1/0088 |
| 2017/0029022 A1* | 2/2017 | Nakamura | B62D 6/10 |
| 2018/0022379 A1* | 1/2018 | Sasaki | B62D 3/126 |
| | | | 701/41 |
| 2018/0141587 A1* | 5/2018 | Yang | B62D 3/12 |
| 2018/0186399 A1 | 7/2018 | Kim | |
| 2018/0229765 A1* | 8/2018 | Sasaki | B62D 5/0463 |
| 2019/0193774 A1* | 6/2019 | Nakada | B62D 6/02 |
| 2020/0023891 A1* | 1/2020 | Lin | G05D 1/0061 |
| 2020/0023892 A1* | 1/2020 | Hong | B62D 5/0469 |
| 2020/0324812 A1* | 10/2020 | Matsuo | B62D 15/025 |

FOREIGN PATENT DOCUMENTS

| | | |
|---|---|---|
| KR | 10-2016-0063618 A | 6/2016 |
| KR | 10-2016-0128105 A | 11/2016 |
| KR | 10-2018-0019820 A | 2/2018 |

\* cited by examiner

CONTROL METHOD OF MDPS

CROSS-REFERENCE(S) TO RELATED APPLICATIONS

This application claims priority to and the benefit of Korean Patent Application No. 10-2018-0128416, filed on Oct. 25, 2018, which is incorporated herein by reference in its entirety.

FIELD

The present disclosure relates to a control method of motor driven power steering (MDPS).

BACKGROUND

The statements in this section merely provide background information related to the present disclosure and may not constitute prior art.

For most vehicle steering apparatuses in the related arts, a hydraulic system has been used, but, in recent years, the trend is gradually changing to MDPS.

The reason is that the MDPS uses a motor instead of the hydraulic system, and accordingly, fuel efficiency is improved.

The MDPS refers to a motor assist based steering apparatus for assisting vehicle steering.

The steering apparatus includes a steering gearbox.

Ball bearings are included in the steering gearbox.

Due to deterioration and damage that comes with the use of the ball bearing, ball-pinching phenomenon may occur.

The ball-pinching is particularly problematic in the belt-type MDPS.

Meanwhile, a step portion of the mounting surface of the subframe causes deformation of the steering gearbox.

The ball-pinching, deformation of the steering gearbox, or the like, causes problems such as a catch-up at the time of steering and poor steering return-ability to a neutral state.

The catch-up refers to a phenomenon in which the steering torque instantaneously increases abnormally when turning the steering wheel clockwise or counterclockwise.

Poor return-ability refers to a phenomenon in which the ability of the steering wheel to return to a neutral state is poor.

When a vehicle maintains a normal straight state, steering is in a neutral state.

A steering remaining angle refers to a rotation angle up to the steering neutral state.

When the steering wheel is in the neutral state, the steering remaining angle is zero, that is, "0".

In a case where the vehicle travels at a predetermined speed, when a driver releases the steering wheel after manipulating the steering wheel to change a traveling direction of the vehicle, the vehicle would maintain the straight state.

In this case, it is normal that the steering remaining angle is zero, and if not, the return-ability is poor.

However, in the MDPS in the related arts, when parts in the steering gearbox are deteriorated or damaged, it is not possible to improve the catch-up phenomenon and the poor return-ability.

In order to solve the problems described above, improvements of the internal parts in the steering gearbox, improvement of the subframe step, and the like, may be taken into consideration.

However, the improvements of the internal parts in the steering gearbox has a limitation in that an expensive facility is required, and the improvements of the subframe step have a limitation in that the addition of a production process is required.

Therefore, in the related arts, when the MDPS failure occurs, it is very difficult to find out the part that is the cause of the failure without improving the internal parts in the steering gearbox or the subframe step.

Accordingly, when accepting the MDPS failure, incorrect maintenance or excessive maintenance, such as replacing the entire gearbox assembly, may occur.

SUMMARY

The present disclosure provides a control method of MDPS for eliminating a feeling of catch-up caused by an abnormal steering torque and improving steering return-ability to a neutral state without improving internal parts in a steering gearbox or a subframe step.

A control method of a motor driven power steering (MDPS) for a vehicle includes determining a steering angle of a steering wheel of the vehicle, determining a steering torque variation rate of the vehicle, counting an exceeding number of times that the steering torque variation rate exceeds a predetermined value to store the counted number of times in an MDPS system, and deleting the number of times stored in the MDPS system when the exceeding number of times is less than a predetermined number of times and applying a reverse phase compensation torque to a steering motor when the exceeding number of times is equal to or larger than the predetermined number of times.

Further, a control method of MDPS for a vehicle includes determining whether or not the vehicle is in a straight state after steering of the vehicle and a steering wheel is in a neutral state, and compensating for a steering angle of the steering wheel of the vehicle by determining poor return-ability of the steering wheel to adjust the steering wheel.

Further, in the control method of MDPS, the determining whether or not the steering wheel is in the neutral state may include determining whether or not a speed of the vehicle is within a predetermined value range, determining whether or not a steering angular velocity of the steering wheel of the vehicle is equal to or less than a predetermined value, determining whether or not a yaw velocity of the vehicle is equal to or less than a predetermined value, and determining whether or not a steering torque of the steering wheel of the vehicle is equal to or less than a predetermined value.

Further, in the control method of MDPS, the compensating for the steering angle may include determining whether or not a steering angle of the steering wheel of the vehicle is equal to or larger than a predetermined value.

Further, a control method of MDPS for a vehicle includes determining whether or not a speed of the vehicle is within a predetermined value range, determining whether or not a steering angular velocity of a steering wheel of the vehicle is equal to or less than a predetermined value, determining whether or not a yaw velocity of the vehicle is equal to or less than a predetermined value, determining whether or not a steering torque of the steering wheel of the vehicle is equal to or less than a predetermined value, determining whether or not a steering angle of the steering wheel of the vehicle is equal to or larger than a predetermined value, and compensating for the steering angle to adjust a steering remaining angle to a steering neutral state when determinations are all made that the speed of the vehicle is within a predetermined value range, the steering angular velocity of a steering wheel of the vehicle is equal to or less than a predetermined value, the yaw velocity of the vehicle is equal to or less than a predetermined value, the steering torque of the steering wheel of the vehicle is equal to or less than a predetermined value, and the steering angle of the steering wheel of the vehicle is equal to or larger than a predetermined value.

Further, a control method of MDPS for a vehicle includes determining a steering angle of a steering wheel of the vehicle and a steering torque variation rate, determining a speed of the vehicle and a steering angular velocity and a yaw velocity of the steering wheel, determining a complex condition including determining whether or not the steering angle of the steering wheel of the vehicle is larger than a predetermined value and whether or not the yaw velocity variation rate satisfies a predetermined value range, and simultaneously performing counting the number of times that the complex conditions are satisfied to store the counted number of times in an MDPS system, and compensating for the steering angle to adjust a steering remaining angle to a steering neutral state, when the complex conditions are all satisfied.

Further, in the control method of MDPS, a reverse phase compensation torque may be applied to a steering motor when the number of times that the complex conditions are satisfied reaches a predetermined number of times.

Further, in the control method of MDPS, in the determining whether or not the steering wheel is in the neutral state, the steering angular velocity of the steering wheel and the steering torque of the vehicle may be included.

Further, in the control method of MDPS, the compensating for the steering angle may include determining whether or not the steering remaining angle exceeds 10 degrees.

Further, in the control method of MDPS, in the determining of the complex conditions, information regarding the steering torque variation rate, the yaw velocity, and the steering remaining angle may be included.

Further, in the control method of MDPS, the speed of the vehicle may be 20 km/h to 60 km/h, the yaw velocity may be equal to or less than 2 deg/s, the steering angular velocity of the steering wheel is equal to or less than 0.5 deg/s, and the steering torque of the vehicle may be equal to or less than 0.5 Nm.

Further, in the control method of MDPS, the determining of the complex conditions may be performed when the steering torque variation rate is equal to or larger than 0.5 Nm/10 msec, and the yaw velocity is equal to or less than 2 deg/s, varies between −1 deg/s and +1 deg/s, and the steering remaining angle is larger than 10 degrees.

As described above, the present disclosure has the following effects.

First, when the steering remaining angle exceeds the predetermined value, since the steering remaining angle is adjusted to zero, it has an advantageous effect of maximizing the driving safety.

Second, since the catch-up at the turn of the steering wheel is eliminated, it has an advantageous effect of making steering smoother.

Third, since the exceeding number of times that the steering torque variation rate exceeds a predetermined value is stored in the MDPS system, it has an advantageous effect of increasing maintenance efficiency when warranty service has to be offered.

Fourth, when both of the steering torque and the steering remaining angle exceeds respective predetermined values, since adjusting the steering remaining angle to zero is first performed, it has an advantageous effect of maximizing driving safety.

Fifth, it has an advantageous effect of maintaining naturalness of steering and stability of traveling straightness without additional expensive equipment or process.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
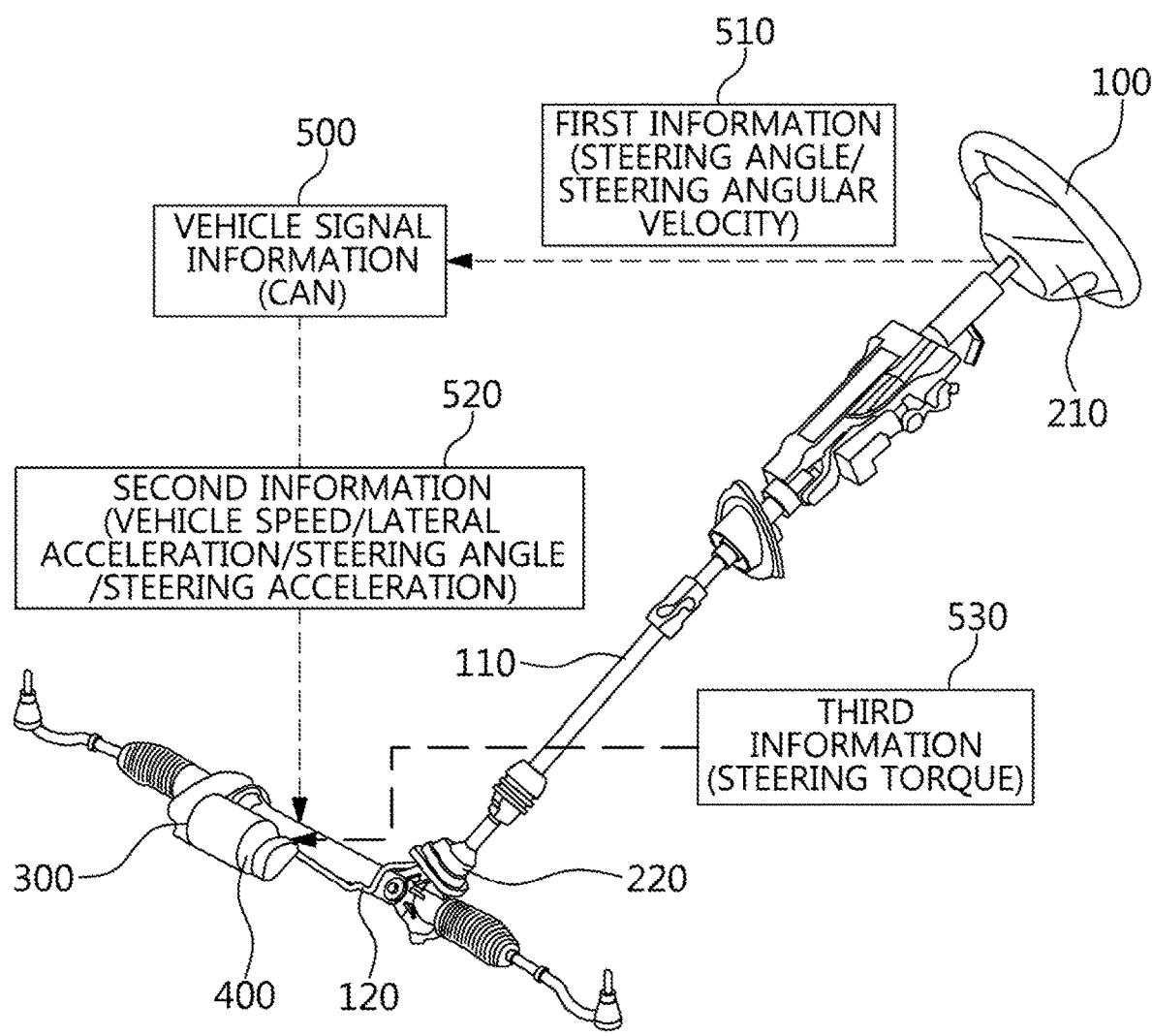
FIG. 1 is an overall system diagram in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Throughout the drawings, similar reference numerals are used to indicate similar parts.

Terms such as "first" and "second" may be used to describe various components, but the components should not be limited by the terms. The terms are used solely for the purpose of distinguishing one component from another component.

For example, a first component may be referred to as a second component without departing from the scope of the present disclosure, and similarly, the second component may also be referred to as the first component. The term "and/or" includes any combination of a plurality of related listed items or any item of a plurality of related listed items.

Unless defined otherwise, all terms used herein, including technical or scientific terms, have the same meaning as commonly understood by one of ordinary skill in the technical field to which the present disclosure belongs.

Terms such as those defined in commonly used dictionaries should be interpreted as having a meaning that is consistent with the meaning in the context of the relevant art, and will not be interpreted in an ideal or overly formal sense unless clearly defined herein.

Meanwhile, when viewed based on a traveling direction, a rotation direction of a steering wheel or a vehicle, which will be described below, is defined as "+" for clockwise rotation or right turn, and "−" for counterclockwise rotation or left turn.

Steering and turning are used in the same meaning.

Figure 2:
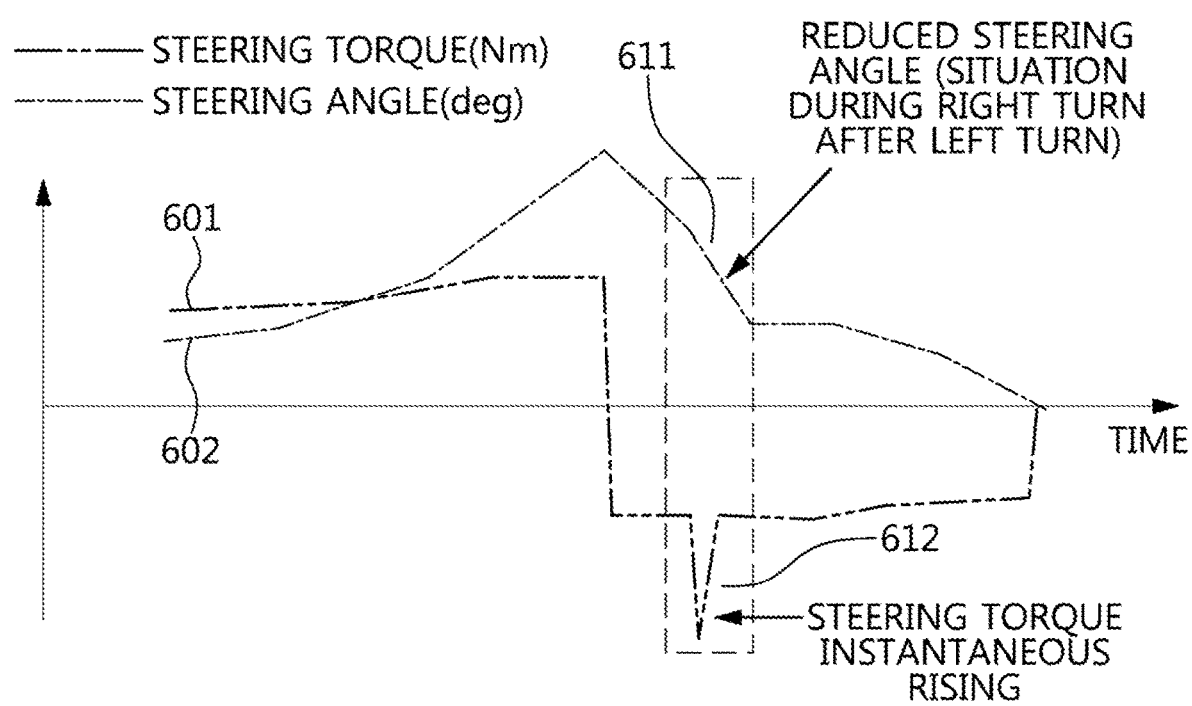
FIG. 2 is a graph showing a catch-up phenomenon.

FIG. 2 is a graph showing a catch-up phenomenon.

A steering torque graph 601 is a graph showing change in the steering torque and a steering angle graph 602 is a graph showing change in the steering angle.

A steering angle reduction portion 611 shows a phenomenon in which a steering angle decreases when a steering wheel 100 changes a direction from "−" to "+".

The steering angle reduction portion 611 appears as the steering torque is instantaneously increased as in a steering torque instantaneous rising portion 612.

The phenomenon is a catch-up phenomenon.

The catch-up phenomenon causes the operation of the steering wheel 100 to be unnatural, which in turn causes a driver to feel uneasy and lowers stability of steering.

Figure 3:
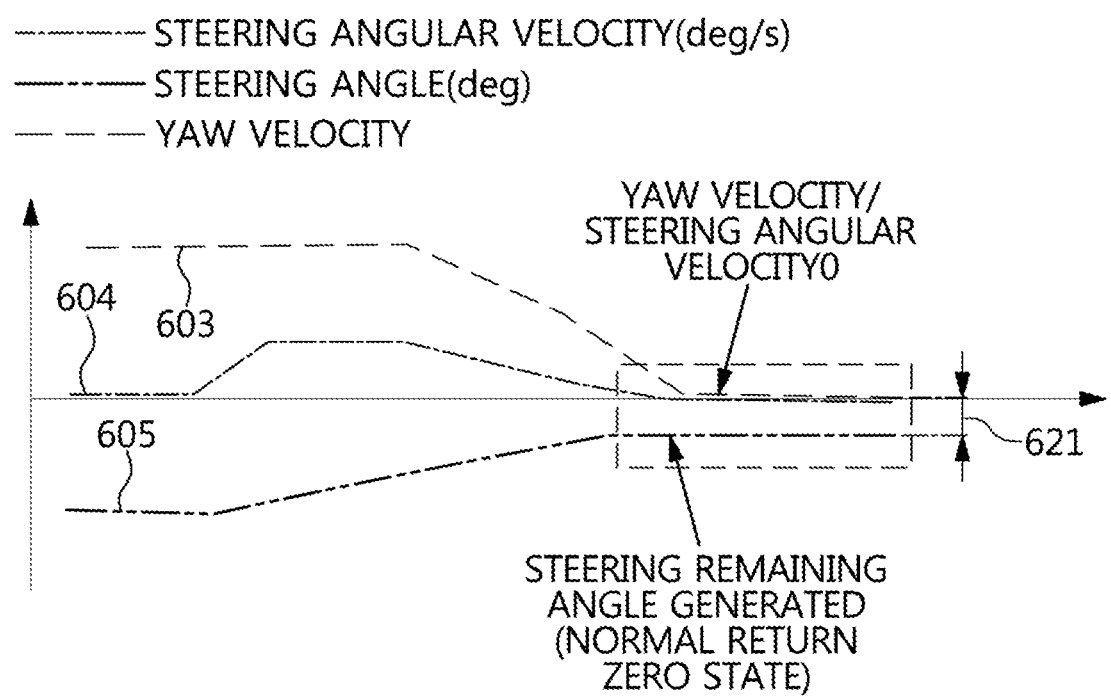
FIG. 3 is a graph showing a poor return-ability.

FIG. 3 is a graph showing a poor return-ability.

A yaw velocity graph 603 is a graph showing change in the yaw velocity, a steering angular velocity graph 604 is a graph showing change in the steering angular velocity, and a steering angle graph 605 is a graph showing change in the steering angle.

In a case where the vehicle travels at a predetermined speed, when the driver releases the steering wheel 100 after changing a traveling direction of the vehicle by manipulating the steering wheel 100, the vehicle tries to maintain the straightness.

Under normal conditions, all of the yaw velocity, the steering angular velocity, and the steering remaining angle are to be zero.

A steering remaining angle generating portion 621 shows a state in which the steering remaining angle is not zero, and this state is the poor return-ability state.

Figure 4:
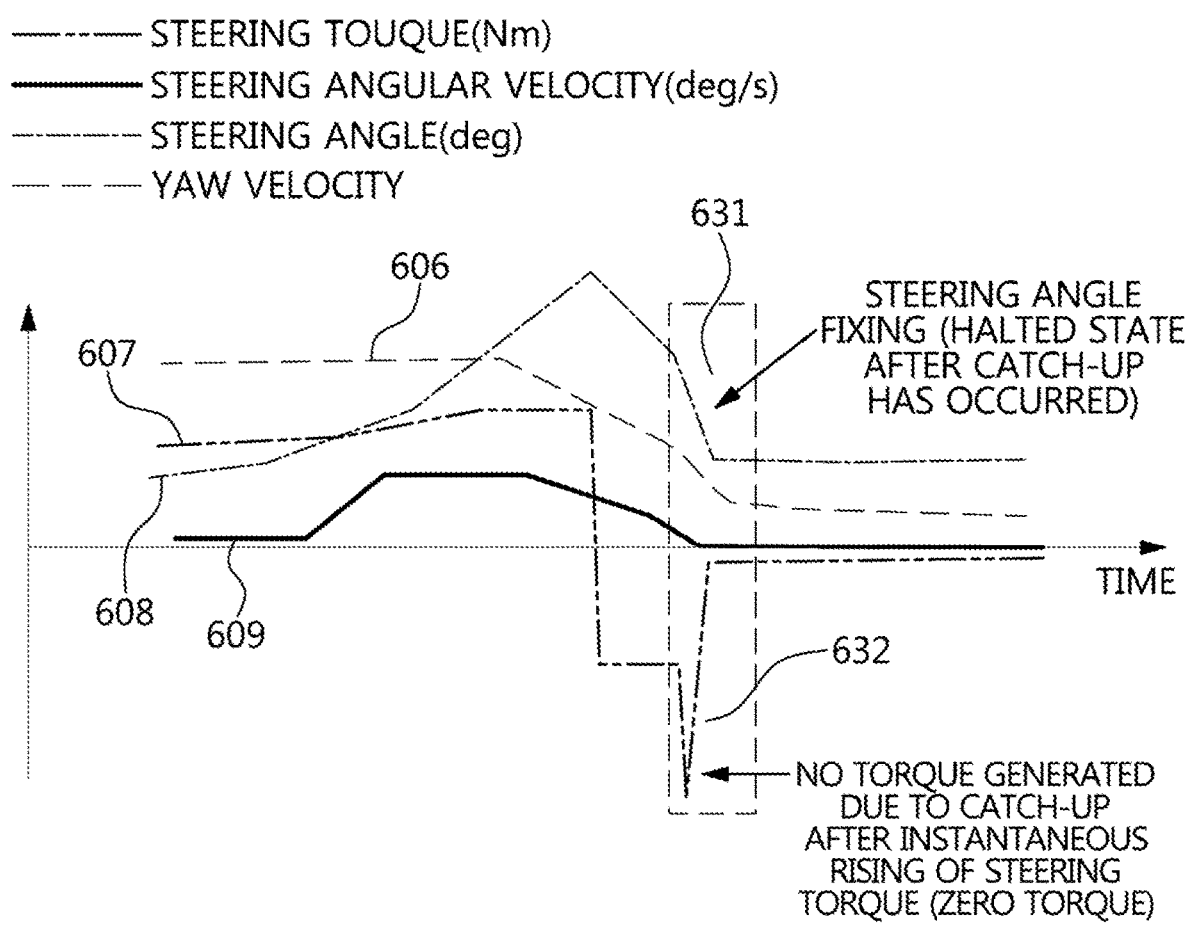
FIG. 4 is a graph in which the catch-up phenomenon and the poor return-ability are generated in combination.

FIG. 4 is a graph in which the catch-up phenomenon and the poor return-ability are generated in combination.

A yaw velocity graph 606 is a graph showing change in the yaw velocity, a steering torque graph 607 is a graph showing change in the steering torque, a steering angle graph 608 is a graph showing change in the steering angle, and a steering angular velocity graph 609 is a graph showing change in the steering angular velocity.

A steering angle fixing portion 631 shows the poor return-ability state in which the steering remaining angle is not zero when the vehicle tries to maintain the straight state after the steering wheel 100 is manipulated.

That is, when the steering wheel 100 changes the direction from "−" to "+", the steering angle is reduced, and is no longer reduced.

A steering-torque-instantaneous-rising-and-then-zero portion 632 indicates that the steering torque instantaneously increases and then the steering torque becomes zero.

Therefore, the steering angle does not reach zero and is fixed at a predetermined angle.

In other words, the vehicle tries to travel straight after changing the direction, but the steering wheel 100 is not returned to the neutral state.

Accordingly, the vehicle may travel while being deflected to one side without returning back to the straight state, unlike the driver's intention.

<Specific Details of the Present Disclosure>

FIG. 1 is an overall system diagram in some forms of the present disclosure.

The MDPS may include a steering wheel 100, a steering column 110, a rack and pinion assembly 120, a first sensor 210, a second sensor 220, a motor 300, and an MDPS electronic control unit (ECU) 400.

The first sensor 210 is connected to the steering wheel 100 to measure the rotation of the steering wheel 100.

The first sensor 210 may preferably be capable of measuring both steering angle and steering angular velocity.

The steering column 110 is mechanically connected to the steering wheel 100 to enable a steering manipulation together with the motor 300.

First information 510 is information measured from the first sensor 210 and is input to the MDPS ECU 400 through a controller area network (CAN) communication module 500.

The CAN communication 500 is a module for processing signal information of the vehicle.

The second sensor 220 measures the steering torque of the vehicle.

The second sensor 220 may be a torque sensor.

Third information 530 is steering torque measurement data and is input to the MDPS ECU 400.

The motor 300 is connected to the rack and pinion assembly 120.

The motor 300 is driven by the MDPS ECU 400 receiving the first information 510, second information 520, and the third information 530.

The first information 510 may include steering angle and steering angular velocity information of the steering wheel.

The second information 520 may include vehicle speed data, vehicle yaw acceleration data (or yaw velocity data), vehicle steering angle data, and vehicle steering angular velocity data.

The third information 530 may include steering torque information.

Figure 5:
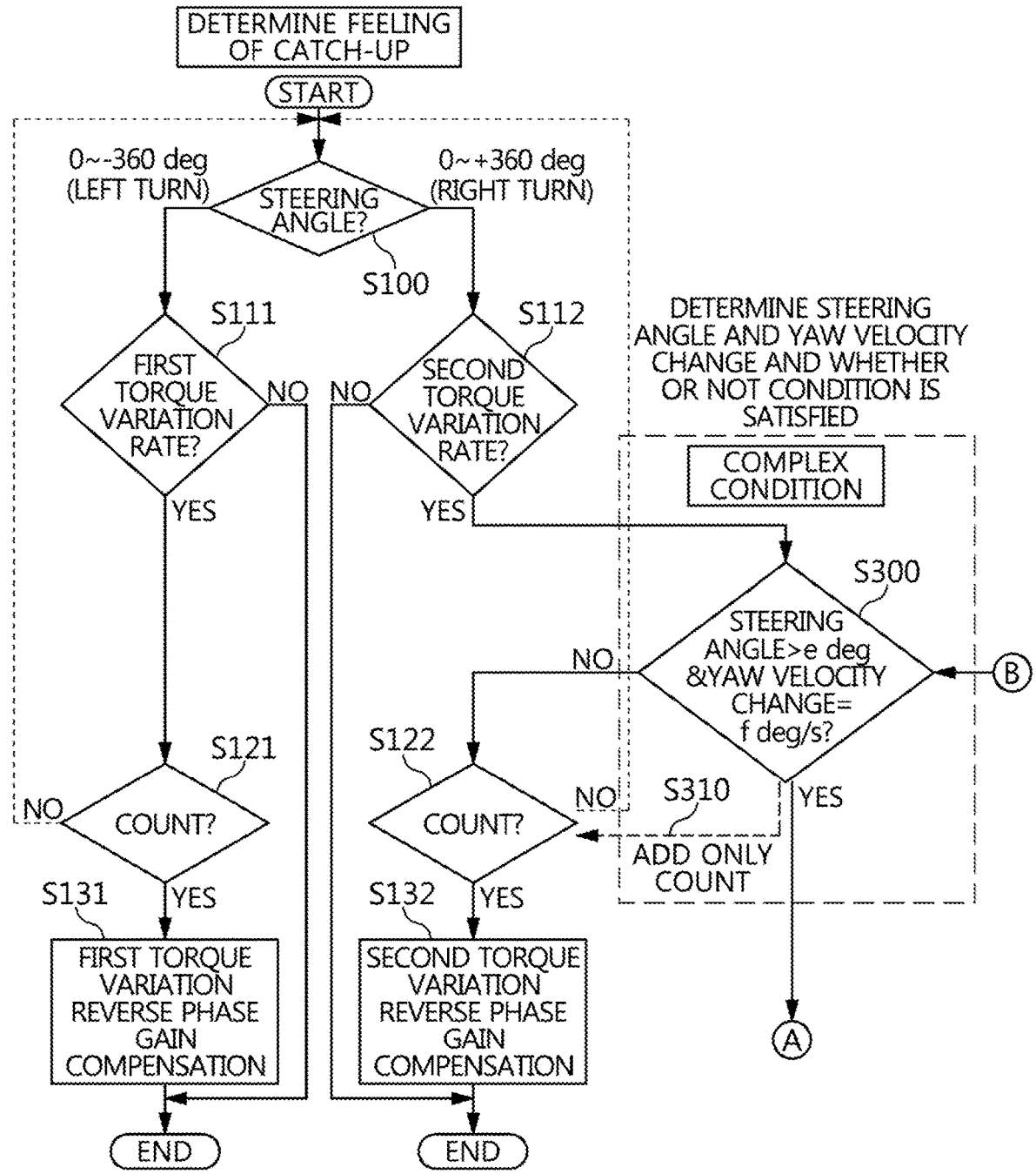
FIG. 5 is a first flowchart in one form of the present disclosure.

FIG. 5 is a first flowchart in some forms of the present disclosure.

Determination of a feeling of steering wheel catch-up will be described using the first flowchart.

The determination of the feeling of steering wheel catch-up is used in the same meaning as the determination of the catch-up phenomenon.

A steering angle determination step S100 measures the steering angle of the steering wheel 100 to determine whether the steering angle is "−" or "+".

The steering angle may preferably be within the range between +360 and −360 degrees.

A first torque variation rate determination step S111 and a second torque variation rate determination step S112 are steps for determining a steering torque variation rate of the vehicle.

When the steering angle of the steering wheel 100 is "−", the first torque variation rate determination step S111 determines whether the steering torque variation rate is equal to or larger than a predetermined value.

The predetermined value of the steering torque variation rate may preferably be 0.5 Nm/10 msec.

Next, in a counting step S121, an exceeding number of times that the steering torque variation rate exceeds the predetermined value is counted.

More specifically, in the counting step S121, the exceeding number of times that the steering torque variation rate exceeds the predetermined value is stored in the MDPS system.

If the exceeding number of times is less than a predetermined number of times, the counted number of times stored in the MDPS system is deleted and the steering angle determination step S100 is performed.

If the exceeding number of times is equal to or larger than the predetermined number of times, the exceeding number of times is stored in the MDPS system and a first torque variation reverse phase gain compensation step S131 is performed. In the first torque variation reverse phase gain compensation step S131, a gain value of the reverse phase is compensated for in the steering torque instantaneous rising portion 612.

Since the first torque variation reverse phase gain compensating step S131 eliminates the catch-up, the driver can perform a more natural and stable manipulation when manipulating the steering wheel 100.

Accordingly, traveling stability is improved.

Next, when the steering angle of the steering wheel 100 is "+", in the second torque variation rate determination step S112, determination is made whether the steering torque variation rate is equal to or larger than the predetermined value.

The predetermined value of the steering torque variation rate may preferably be 0.5 Nm/10 msec.

If the steering torque variation rate is equal to or larger than the predetermined value in the second torque variation rate determination step S112, a complex condition determination step S300 is performed.

In the complex condition determination step S300, information regarding the steering torque variation rate, the yaw velocity, and steering remaining angle is included.

In the complex condition determination step S300, determination is made whether the steering angle is larger than the predetermined value and whether the yaw velocity variation rate satisfies the range of the predetermined value.

If at least one condition in the complex condition is not satisfied in the complex condition determination step S300, a counting step S122 is performed.

If the complex condition is all satisfied in the complex condition determination step S300, a counting step of counting the number of times that the complex condition id satisfied to store a complex condition satisfaction number in the MDPS system and a steering angle compensation step S250 of adjusting the steering remaining angle to the steering neutral state are simultaneously performed.

In the complex condition determination step S300, when the number of times that the complex condition is satisfied reaches a predetermined number of times, a reverse phase compensation torque is applied to a steering motor.

Here, a predetermined value of the steering angle (e) may be 10 deg, and a predetermined value of the yaw velocity variation rate may be +/−1 deg/s.

In the counting step S122, the exceeding number of times that the steering torque variation rate exceeds the predetermined value is counted.

If the exceeding number of times is less than the predetermined number of times, the number of counts is deleted and the steering angle determination step S100 is performed.

If the exceeding number of times is equal to or larger than the predetermined number of times, the exceeding number of times is stored in the MDPS system, that is, the MDPS ECU 400 and a second torque variation reverse phase gain compensation step S132 is performed.

Since the second torque variation reverse phase gain compensation step S132 eliminates the catch-up phenomenon, the driver can perform a more natural and stable manipulation when manipulating the steering wheel 100.

Accordingly, traveling stability is improved.

It should be noted that in the steering angle determination step S100, the first torque variation rate determination step S111, the counting step S121, and the first torque variation reverse phase gain compensation step S131, a case in which a manipulation direction of the steering wheel 100 is "+" is described, and in the steering angle determination step S100, the second torque variation rate determination step S112, the counting step S122, and the second torque variation reverse phase gain compensation step S132, a case in which the manipulation direction of the steering wheel 100 is "−" is also applicable.

Figure 6:
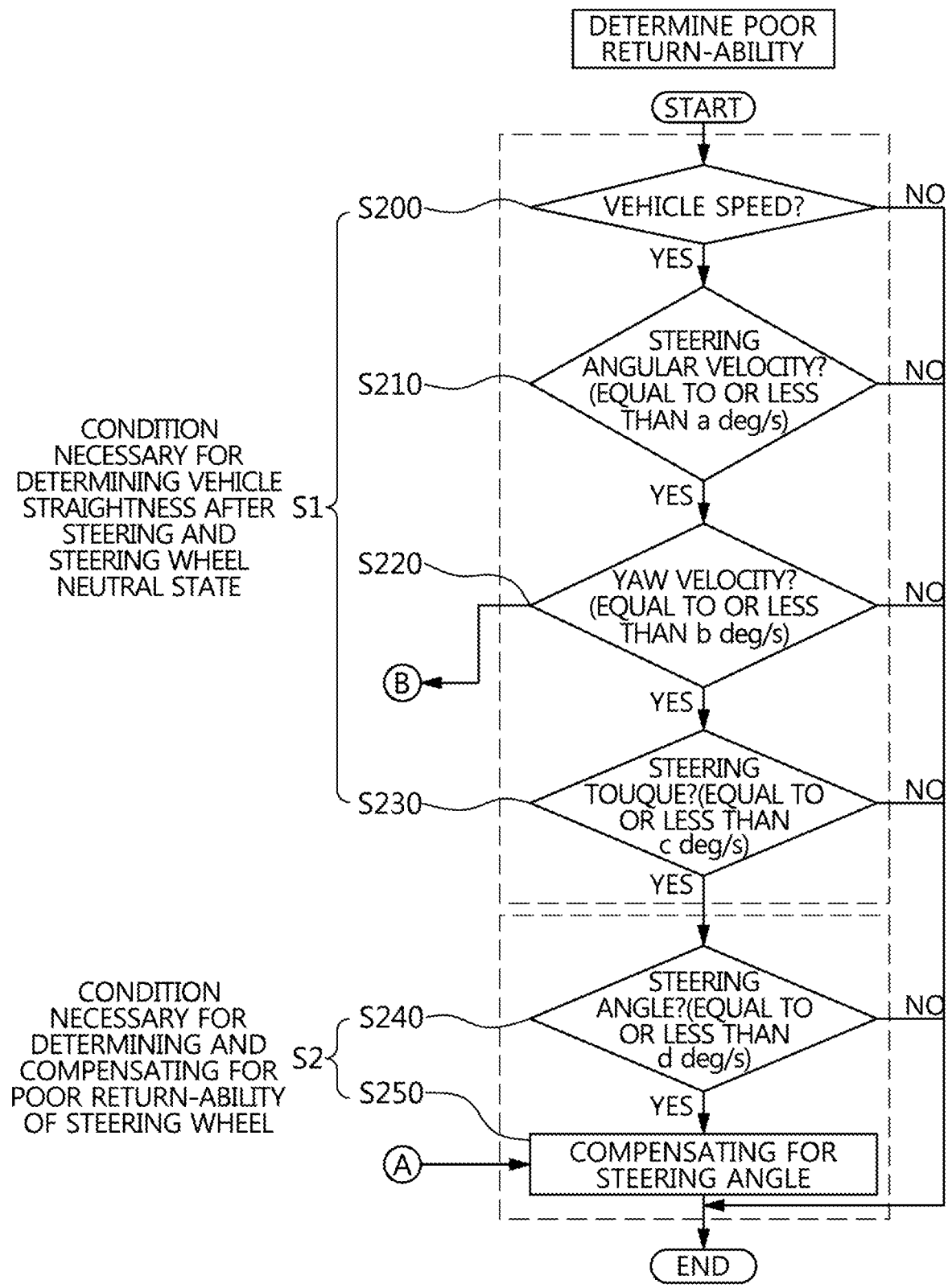
FIG. 6 is a second flowchart in one form of the present disclosure.

FIG. 6 is a second flowchart in some forms of the present disclosure.

Next, a poor return-ability determination method will be described.

In a vehicle speed determination step S200, determination is made whether the current traveling speed of the vehicle corresponds to a predetermined value.

The predetermined value of the traveling speed may be within a range of 20 km/h to 60 km/h.

Next, in a steering angular velocity determination step S210, determination is made whether the steering angular velocity is equal to or less than a predetermined value.

The predetermined value of the steering angular velocity (a) may be 0.5 deg/s.

Next, in a yaw velocity determination step S220, determination is made whether the yaw velocity is equal to or less than a predetermined value.

The predetermined value of the yaw velocity (b) may be 2 deg/s.

If the yaw velocity is equal to or less than the predetermined value in the yaw velocity determination step S220, a steering torque determination step S230 is performed.

In the steering torque determination step S230, determination is made whether the steering torque is equal to or less than the predetermined value.

The predetermined value of the steering torque (c) may be 0.5 Nm.

If the steering torque is equal to or less than the predetermined value in the steering torque determination step S230, a steering angle determination step S230 is performed.

In the steering angle determination step S240, determination is made whether the steering angle is equal to or less than the predetermined value.

The predetermined value of the steering torque (d) may be 10 deg/s.

If the steering angle is equal to or less than the predetermined value in the steering angle determination step S240, a steering angle compensation step S250 is performed.

In the steering angle compensation step S250, the steering angle is compensated such that the steering remaining angle becomes zero.

Meanwhile, if the yaw velocity is not less than the predetermined value in the yaw velocity determination step S220, the complex condition determination step S300 is performed.

The flows after the complex condition determination step S300 are as described above.

However, if the steering angle is larger than 10 degrees and the yaw velocity variation rate is ±1 deg/s in the complex condition determination step S300, the steering angle compensation step S250 is performed.

Meanwhile, the vehicle speed determination step S200, the steering angular velocity determination step S210, the yaw velocity determination step S220, and the steering torque determination step S230 are conditions necessary for determining whether the vehicle is in a straight state and the steering wheel is in a neutral state after steering (S1).

More specifically, in the neutral state determination condition (S1), determination is made whether or not the vehicle is in the straight state and the steering wheel is in the neutral state after steering.

In the neutral state determination condition (S1), information regarding the vehicle speed, the yaw velocity, the steering angular velocity of the steering wheel, and the steering torque of the vehicle is included.

In addition, the steering angle determination step S240 and the steering angle compensation step S250 are conditions necessary for determining and compensating for a poor return-ability of the steering wheel (S2).

More specifically, the condition for determining and compensating for a poor return-ability of the steering wheel (S2) refers to a steering angle compensation step of adjusting the steering angle of the steering wheel of the vehicle by determining the poor return-ability of the steering wheel.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control method of a motor driven power steering (MDPS) for a vehicle comprising:
    determining whether the vehicle is in a straight state after steering the vehicle and whether a steering wheel is in a neutral state; and
    compensating a steering angle of the steering wheel by checking a return-ability of the steering wheel to adjust the steering wheel,
    wherein determining whether the steering wheel is in the neutral state comprises:
    determining whether a speed of the vehicle is within a predetermined range;
    determining whether a steering angular velocity of the steering wheel is equal to or less than a first predetermined value;
    determining whether a yaw velocity of the vehicle is equal to or less than a second predetermined value; and
    determining whether a steering torque of the steering wheel is equal to or less than a third predetermined value, and
    wherein determining whether the steering wheel is in the neutral state further comprises:
    determining whether a steering torque variation rate is greater than a predetermined value and whether a yaw velocity variation rate satisfies a predetermined range is based on information regarding the steering torque variation rate, the yaw velocity of the steering wheel, and a steering remaining angle.

2. The control method of MDPS of claim 1, wherein compensating the steering angle comprises:
    determining whether the steering angle of the steering wheel is equal to or greater than a fourth predetermined value.

3. The control method of MDPS of claim 2, wherein compensating the steering angle comprises:
    determining whether a steering remaining angle exceeds 10 degrees.

4. The control method of MDPS of claim 1, wherein determining whether the steering wheel is in the neutral state is based on information regarding the speed of the vehicle, the yaw velocity of the vehicle, the steering angular velocity of the steering wheel, and the steering torque of the steering wheel.

5. The control method of MDPS of claim 4, wherein:
    the speed of the vehicle is 20 km/h to 60 km/h;
    the yaw velocity of the vehicle is equal to or less than 2 deg/s;
    the steering angular velocity of the steering wheel is equal to or less than 0.5 deg/s; and
    the steering torque of the steering wheel is equal to or less than 0.5 Nm.

6. A control method of a motor driven power steering (MDPS) for a vehicle, comprising:
    determining a steering angle of a steering wheel and a steering torque variation rate;
    determining a speed of the vehicle, a steering angular velocity of the steering wheel, and a yaw velocity of the steering wheel;
    determining whether the steering angle of the steering wheel is greater than a first predetermined value and whether a yaw velocity variation rate satisfies a predetermined range; and
    counting a number of times that the steering angle is determined to be greater than the first predetermined value and the yaw velocity variation rate is determined to satisfy the predetermined range to store the counted number of times in an MDPS system, and compensating the steering angle to adjust a steering remaining angle to a steering neutral state, wherein counting and compensating are performed simultaneously,
    wherein the method further includes determining whether the steering torque variation rate is greater than the first predetermined value and whether the yaw velocity variation rate satisfies the predetermined range is based on information regarding the steering torque variation rate, the yaw velocity of the steering wheel, and the steering remaining angle.

7. The control method of MDPS of claim 6, wherein a reverse phase compensation torque is applied to a steering motor when the number of times reaches a predetermined number of times.

8. The control method of MDPS of claim 6, wherein the control method comprises:
    when the steering torque variation rate is equal to or greater than 0.5 Nm/10 msec, and the yaw velocity of the steering wheel is equal to or less than 2 deg/s varying between −1 deg/s and +1 deg/s, and the steering remaining angle is greater than 10 degrees, determining that the steering wheel is greater than the first predetermined value and that the yaw velocity variation rate satisfies the predetermined range.

* * * * *